(12) United States Patent
Yahara et al.

(10) Patent No.: US 9,416,242 B2
(45) Date of Patent: Aug. 16, 2016

(54) FOAMABLE COMPOSITION

(71) Applicant: SEKISUI CHEMICAL CO., LTD., Osaka (JP)

(72) Inventors: Kazuyuki Yahara, Osaka (JP); Yozo Toei, Osaka (JP); Yuji Tanikawa, Osaka (JP); Masahiro Hamada, Saitama (JP); Akihito Dohi, Saitama (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 14/407,171

(22) PCT Filed: Sep. 27, 2013

(86) PCT No.: PCT/JP2013/076265
§ 371 (c)(1),
(2) Date: Dec. 11, 2014

(87) PCT Pub. No.: WO2014/051051
PCT Pub. Date: Apr. 3, 2014

(65) Prior Publication Data
US 2015/0203648 A1 Jul. 23, 2015

(30) Foreign Application Priority Data
Sep. 28, 2012 (JP) .................................. 2012-218219

(51) Int. Cl.
*C08J 9/00* (2006.01)
*C08J 9/04* (2006.01)
*C08J 9/14* (2006.01)
*C08L 23/16* (2006.01)

(52) U.S. Cl.
CPC *C08J 9/142* (2013.01); *C08J 9/141* (2013.01); *C08L 23/16* (2013.01); *C08J 2201/026* (2013.01); *C08J 2203/12* (2013.01); *C08J 2203/14* (2013.01); *C08J 2205/044* (2013.01); *C08J 2323/16* (2013.01)

(58) Field of Classification Search
None
See application file for complete search history.

(56) References Cited

U.S. PATENT DOCUMENTS

| | | |
|---|---|---|
| 2005/0154132 A1 | 7/2005 | Hakuta et al. |
| 2006/0258793 A1 | 11/2006 | Nonaka et al. |
| 2010/0222445 A1* | 9/2010 | Nakano ................. C08F 210/18 521/140 |
| 2010/0317758 A1 | 12/2010 | Okuda et al. |
| 2015/0064435 A1 | 3/2015 | Yahara et al. |

FOREIGN PATENT DOCUMENTS

| | | |
|---|---|---|
| CN | 1296510 A | 5/2001 |
| CN | 101921433 A | 12/2010 |
| CN | 104284926 A | 1/2015 |
| JP | 10-168219 | 6/1998 |
| JP | H10-168219 | 6/1998 |
| JP | 11-322993 | 11/1999 |
| JP | H11-322993 | 11/1999 |
| JP | 2002371152 A * | 12/2002 |
| JP | 2006-70260 | 3/2006 |
| JP | 2010-215805 | 9/2010 |
| WO | 2013/147104 | 10/2013 |

OTHER PUBLICATIONS

International Search Report issued Jan. 7, 2014 in International (PCT) Application No. PCT/JP2013/076265.
Chinese Office Action issued Jun. 24, 2015, in the corresponding Chinese Application No. 201380032152.3.

* cited by examiner

*Primary Examiner* — Kara Boyle
(74) *Attorney, Agent, or Firm* — Wenderoth, Lind & Ponack, L.L.P.

(57) ABSTRACT

The foamable composition according to the present invention comprises a copolymer of ethylene, an α-olefin and a non-conjugated diene, a blowing agent, a crosslinking agent, a catalyst and a reaction suppressor, wherein in the foamable composition, the storage elastic modulus at 23° C. as measured by a viscoelasticity measuring apparatus is $2 \times 10^4$ Pa or lower, and the storage elastic modulus after the foamable composition is held at 115° C. for 200 seconds is $5 \times 10^4$ Pa or higher; thereby, a foam body having a low expansion ratio, a low compression strength and a high cushioning property can be produced.

6 Claims, No Drawings

FOAMABLE COMPOSITION

TECHNICAL FIELD

The present invention relates to a foamable composition comprising a copolymer of ethylene, an α-olefin and a non-conjugated diene, a blowing agent, a crosslinking agent, a catalyst and a reaction suppressor.

BACKGROUND ART

Foam bodies are used as a seal material which seals a peripheral part of a component and a chassis which requires protection from a gas or a liquid, and a cushioning material which damps vibration and impact, in many fields including fields of architecture, civil engineering construction, electric appliances, electronics and vehicles.

Foam bodies are obtained by a treatment such as blowing of a resin composition mainly comprising an olefin resin and an elastomer. Examples of these foam bodies include foam bodies of thermoplastic resins such as a polyethylene resin and a polypropylene resin, and foam bodies of rubbers such as a synthetic rubber and a natural rubber, and so forth.

When a foam body is used as a seal material or a cushioning material, several characteristics are required, including that compression flexibility of a foam body, that is, the repulsive stream of a foam body to recover from compressed state, is arranged appropriately in accordance with quality of a material of a good in which the said foam body is used and with a use condition thereof; and that the thus arranged repulsive stress and a seal performance are kept during a usable period of a good in which the foam body is used.

In recent years, downsizing of a device has markedly advanced in an electronics field. In a small electronic device having a display area such as a mobile phone, the ratio of the display area to the main chassis surface is desired as large as possible. Because of this, thickness required to a foam body to be disposed between a display panel and a chassis (in a clearance) tends to be thinner than ever and the width thereof tends to be narrower as well.

As one example of a foam body arrangeable under the restriction of such a narrow clearance, a foam body is proposed in which the impact resistance is improved by making its density 0.01 to 0.20 g/cm$^3$ and its average foam cell diameter 10 to 65 μm, and the thickness of the foam body is made to be 0.1 to 1.0 mm (see Patent Literature 1). It is constructed that the foam body is arrangeable even in a narrow clearance of 0.1 to 1.0 (inclusive).

CITATION LIST

Patent Document

Patent Document 1: JP2010-215805A

SUMMARY OF INVENTION

Technical Problem

In the case of a foam body whose thickness is restricted as described above, however, since the density is low even if the sealing property is good, for example, in some cases where the foam body is disposed at a place requiring the performance as an impact absorbing material, a sufficient cushioning property cannot be provided for an excessive impact energy. A further improvement of the impact resistance is thus desired on foam bodies even in the severe restriction of their size.

Then, an object of the present invention is to provide a foamable composition from which foam bodies having a low expansion ratio, a low compression strength and a high cushioning property can be produced.

Solution to Problem

Inventors of the present invention carried out an extensive investigation; and as a result, it was found that the aforementioned problems could be solved by adjusting the storage elastic modulus of a foamable composition; and based on this finding, the present invention could be completed.

The present invention includes the following content.

A foamable composition comprised a copolymer of ethylene, an α-olefin and a non-conjugated diene, a blowing agent, a crosslinking agent, a catalyst and a reaction suppressor, wherein in the foamable composition, the storage elastic modulus at 23° C. as measured by a viscoelasticity measuring apparatus is 2×10$^4$ Pa or lower; and the storage elastic modulus after the foamable composition is held at 115° C. for 200 seconds is 5×10$^4$ Pa or higher.

Advantageous Effects of Invention

The present invention can provide a foamable composition from which a foam body having a low expansion ratio, a low compression strength and a high cushioning property can be produced.

DESCRIPTION OF EMBODIMENTS

Foamable Composition

A foamable composition according to an embodiment of the present invention is a foamable composition comprising a copolymer of ethylene, an α-olefin and a non-conjugated diene, a blowing agent, a crosslinking agent, a catalyst and a reaction suppressor, wherein in the foamable composition, the storage elastic modulus at 23° C. as measured by a viscoelasticity measuring apparatus is 2×10$^4$ Pa or lower; and the storage elastic modulus after the foamable composition is held at 115° C. for 200 seconds is 5×10$^4$ Pa or higher.

Characteristics of the Foamable Composition

<Storage Elastic Modulus> the storage elastic modulus at 23° C. of the foamable composition according to the present invention is 2×10$^4$ Pa or lower, and the storage elastic modulus after the foamable composition is held at 115° C. for 200 seconds is 5×10$^4$ Pa or higher.

Here, the "storage elastic modulus" is a value measured by a viscoelasticity measuring apparatus "MCR-301," manufactured by Anton-Paar GmbH. The value is obtained by taking about 80 mg of a foamable composition as a measuring sample, and carrying out the measurement at an angular frequency of 1 (/sec), at a vibrating angle of 1% and at a predetermined temperature.

If the storage elastic modulus at a temperature of 23° C. exceeds 2×10$^4$ Pa, when a foamable composition is blown with a blowing agent, there arises a problem which is that the growth of foams is inhibited. From this viewpoint, the storage elastic modulus is preferably 1×10$^4$ Pa or lower, and more preferably 5×10³ Pa or lower; and the lower limit value is preferably 1×10⁰ Pa, and more preferably 5×10⁰ Pa.

If the storage elastic modulus after the foamable composition is held at 115° C. for 200 seconds is lower than 5×10⁴ Pa, foams are liable to be broken, leading to the shrinkage of the foam body and the coarsening of foams due to unification of adjacent foams, thus posing a problem which is that a predetermined characteristics cannot be provided. From this viewpoint, the storage elastic modulus after the foamable composition is held at 115° C. for 200 seconds is preferably 6×10⁴ Pa or higher, and more preferably 1×10⁵ Pa or higher. The upper limit value is preferably 1×10⁶ Pa, and more preferably 5×10⁵ Pa.

Copolymer to Constitute the Foamable Composition

A copolymer to constitute a foam body obtained by using the foamable composition according to the present invention is a copolymer of ethylene, an α-olefin and a non-conjugated diene (hereinafter, referred to as copolymer a), or preferably a copolymer which is obtained by crosslinking these random copolymers.

<α-Olefin>

α-Olefins having 3 to 20 carbon atoms are preferable. The α-olefin includes propylene, 1-butene, 4-methyl-1-pentene, 1-hexene, 1-heptene, 1-octene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene and 12-ethyl-1-tetradecene. Among them, α-olefins having 3 to 10 carbon atoms are preferable, while propylene, 1-butene, 1-hexene and 1-octene are most preferably used. These α-olefins may be used solely or as a combination of two or more of them. Among the above-mentioned α-olefins, propylene is used utmost preferably.

<Non-Conjugated Diene> the non-conjugated diene may be exemplified by linear non-conjugated dienes, alicyclic non-conjugated dienes and further norbornene derivatives shown by the following general formula [I]. These may be used solely or as a combination of two or more of them.

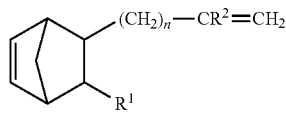

[I]

In the general formula [I], character "n" represents an interger of 0 to 10; $R^1$ represents a hydrogen atom or an alkyl group having 1 to 10 carbon atoms; and $R^2$ represents a hydrogen atom or an alkyl group having 1 to 5 carbon atoms.

Specific examples of the linear non-conjugated dienes include 1,4-hexadiene, 3-methyl-1,4-hexadiene, 4-methyl-1,4-hexadiene, 5-methyl-1,4-hexadiene, 4,5-dimethyl-1,4-hexadiene and 7-methyl-1,6-octadiene.

Specific examples of the cyclic non-conjugated dienes include 5-methylene-2-norbornene, 1-methyl-5-methylene-2-norborne, 1-ethyl-5-methylene-2-norbornene, 5-ethylidene-2-norbornene, 5-isopropylidene-2-norbornene, 5-vinylidene-2-norbornene, 6-chloromethyl-5-isopropenyl-2-norbornene, dicyclopentadiene and methyltetrahydroindene.

Specific examples of the norbornene derivatives shown by the general formula [I] include 5-vinyl-2-norbornene, 5-(2-propenyl)-2-norbornene, 5-(3-butenyl)-2-norbornene, 5-(1-methyl-2-propenyl)-2-norbornene, 5-(4-pentenyl)-2-norbornene, 5-(1-methyl-3-butenyl)-2-norbornene, 5-(5-hexenyl)-2-norbornene, 5-(1-methyl-4-pentenyl)-2-norbornene, 5-(2,3-dimethyl-3-butenyl)-2-norbornene, 5-(2-ethyl-3-butenyl)-2-norbornene, 5-(6-heptenyl)-2-norbornene, 5-(3-methyl-5-hexenyl)-2-norbornene, 5-(3,4-dimethyl-4-pentenyl)-2-norbornene, 5-(3-ethyl-4-pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene and 5-(1,2,3-trimethyl-4-pentenyl)-2-norbornene.

Among them, preferable are 5-vinyl-2-norbornene, 5-(2-propenyl)-2-norbornene, 5-(3-butenyl)-2-norbornene, 5-(4-pentenyl)-2-norbornene, 5-(5-hexenyl)-2-norbornene, 5-(6-heptenyl)-2-norbornene and 5-(7-octenyl)-2-norbornene. These norbornene compounds may be used solely or as a mixture of two or more of them. Among them, 5-vinyl-2-norbornene is especially preferably used.

The copolymer A is preferably a copolymer of ethylene, propylene and a norbornene derivative.

Meanwhile, the non-conjugated diene to constitute the copolymer A may be, in addition to the linear non-conjugated dienes, the alicyclic non-conjugated dienes and the norbornene derivatives shown by the general formula [I], non-conjugated polyenes including trienes such as 2,3-diisopropylidene-5-norbornene, 2-ethylidene-3-isopropylidene-5-norbornene, 2-propenyl-2,2-norbornadiene. These may be used together with the afore-mentioned non-conjugated dienes.

<Ratio of Resin Components to Constitute the Foam Body> the blending ratio of ethylene in the resin of copolymer A is, relative to 100 parts by mass of the copolymer, preferably in the range of 20 to 80 parts by mass, or more preferably in the range of 30 to 70 parts by mass.

The blending ratio of the α-olefin in the resin of copolymer A is, relative to 100 parts by mass of the copolymer, preferably in the range of 20 to 60 parts by mass, or more preferably in the range of 30 to 50 parts by mass.

The blending ratio of the non-conjugated diene in the resin of copolymer A is, relative to 100 parts by mass of the copolymer, preferably in the rnage of 2 to 30 parts by mass, or more preferably in the range of 3 to 20 parts by mass.

<Crosslinking Agent>

As to the crosslinking agent to be used for forming the foam body, a compound having exhibiting a compatibility or good dispersibility with the copolymer A may be used. Especially when the non-conjugated diene component of the copolymer A is the norboenene derivative shown by the general formula [I], it is preferable to use a siloxane compound having plural SiH groups per molecule. In other words, the resin to constitute the foam body is preferably a resin which is obtained by crosslinking the copolymer A by a siloxane compound having plural SiH groups per molecule.

The siloxane compound having 2 SiH groups per molecule may be exemplified by a SiH group-containing compound (1) shown by the following general formula [II]. The siloxane compound having 3 SiH groups per molecule may be exemplified by a SiH group-containing compound (2) shown by the following general formula [III].

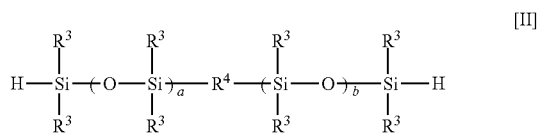

In the general formula [II], $R^3$ represents a monovalent group having 1 to 10 carbon atoms or an optionally substituted saturated hydrocarbon or aromatic hydrocarbon, wherein they may be the same or different in one molecule; character "a" represents an integer of 0 to 20; character "b" represents and integer of 0 to 20; and $R^4$ represents a divalent organic group having 1 to 30 carbon atoms or an oxygen atom.

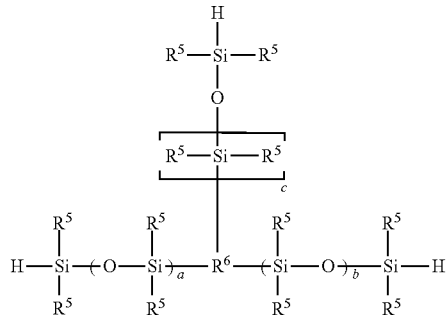

In the general formula [III], $R^5$ represents a monovalent group having 1 to 10 carbon atoms or an optionally substituted saturated hydrocarbon or aromatic hydrocarbon, wherein they may be the same or different in one molecule; characters "a," "b" and "c" each represent independently an integer of 0 to 20; and $R^6$ represents a trivalent organic group having 1 to 30 carbon atoms.

The SiH group-containing compound (1) having 2 SiH groups per molecule shown by the general formula [II] contains the SiH groups at the both molecular terminals, and has 2 SiH groups per molecule. Specific examples of $R^3$ in the general formula [II] include a methyl group, an ethyl group, a propyl group, an isopropyl group, a butyl group, an amyl group, a cyclopentyl group, a hexyl group, a cyclohexyl group, an octyl group, a chloromethyl group, 2-chloroethyl group, 3-chloropropyl group, a phenyl group, a phenylmethyl group, 2-phenylethyl group and 2-phenylpropyl group. Preferable groups are a methyl group, an ethyl group and a phenyl group. Character "a" is an integer of 0 to 20, and character "b" is an integer of 0 to 20. Both "a" and "b" are preferably 10 or less; more preferably, 5 or less; most preferably, 2 or less; or utmost preferably, 2 or less equally.

The preferable SiH group-containing compound (1) having 2 SiH groups per molecule mentioned above may be exemplified by the siloxane compound shown by the following formula.

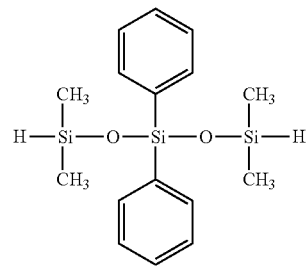 [SMILES: C[SiH](C)O[Si](O[SiH](C)C)(c1ccccc1)c1ccccc1]

The preferable SiH group-containing compound (2) having 3 SiH groups per molecule may be exemplified by the siloxane compound shown by the following formula.

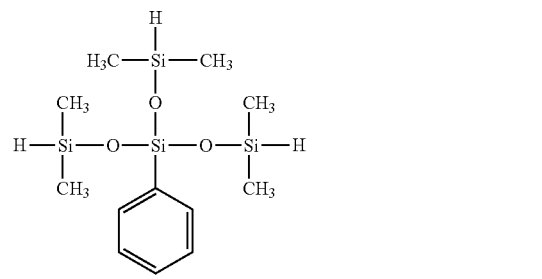 [SMILES: C[SiH](C)O[Si](O[SiH](C)C)(O[SiH](C)C)c1ccccc1]

The blending ratio of the crosslinking agent in the resin of the copolymer A is, relative to 100 parts by mass of the copolymer, preferably in the range of 3 to 25 parts by mass, more preferably in the range of 5 to 20 parts by mass, or still more preferably in the range of 5 to 16 parts by mass. When the blending ratio of the crosslinking agent is within this range, a blowing agent continuous porosity may be obtained.

<Blowing Agent>

The blowing agent usable is an organic solvent which is liquid at 23° C., has a good dispersibility with the copolymer, and decomposes or vaporizes by heating to thereby generate a gas. The boiling point of a blowing agent is preferably 200° C. or lower, or more preferably 150° C. or lower. An organic solvent applicable as a blowing agent is not especially limited as long as being an organic solvent whose evaporation rate is in the range of 0.5 to 8.0.

Here, the "evaporation rate" is a relative evaporation rate when the evaporation rate at 25° C. of n-butyl acetate is taken to be 1.0. If the relative evaporation rate is lower than 0.5, since the crosslinking reaction is completed before blowing, there arises a problem which is that the expansion ratio becomes low. By contrast, if exceeding 8.0, the blowing rate becomes too fast to thereby break foams. Here, as relative evaporation rates when the evaporation rate of n-butyl acetate is taken to be 1.0, numerical values described in "CONVERTING TECHNOLOGY HANDBOOK" (2006, Converting Technical Inst.).

The blending ratio of the blowing agent in the copolymer A is, relative to 100 parts by mass of the copolymer, preferably in the range of 1 to 80 parts by mass, more preferably in the range of 3 to 50 parts by mass, or still more preferably in the range of 5 to 10 parts by mass. When the blending ratio of the blowing agent is within this range, the porosity of a foam body can be made to be 50 to 95% by volume and the compression strength can be made low.

Specific examples of the blowing agents include chain or cyclic hydrocarbons such as butane, pentane, hexane, octane, nonane, decane, undecane, cyclopentane and cyclohexane, ketones such as cyclopentanone, cyclohexanone and methyl ethyl ketone, esters such as ethyl acetate and butyl acetate, ethers such as tetrahydrofuran, aromatics such as benzene, toluene, xylene and ethylbenzene, nitrogen-containing compounds such as acetonitrile and N,N-dimethylformamide, and halogen-containing compounds such as methylene chloride, chloroform and chlorofluorocarbons. These blowing agents may be used solely or concurrently. Among them, solvents having a boiling point of 150° C. or lower are preferably used, and particularly methyl ethyl ketone, toluene and hexane are preferable.

<Catalyst>

As to the catalyst, there is no restriction, provided that it is used as the catalyst in the hydrosilylation reaction, and illustrative examples thereof include platinum catalysts such as chloroplatinic acid, platinum olefin complexes, platinum vinyl siloxane complexes, platinum black, a platinum triphenylphosphine complex, a platinum carbonyl complex and platinum acetylacetonato; palladium catalysts; and rhodium catalysts.

As the platinum catalyst, preferably used is a mixture of 3% Pt-CTS-CTS solution (manufactured by N.E. Chemcat Corp.), a Pt/1,3,5,7-tetravinyl-1,3,5,7-tetramethylcyclotetrasiloxane complex and 1,3,5,7-tetravinyl-1,3,5,7-tetramethylcyclotetrasiloxane.

The blending ratio of the catalyst in the resin of the copolymer A is, relative to 100 parts by mass of the copolymer, preferably in the range of 0.01 to 3.0 parts by mass, or more preferably in the range of 0.05 to 1.0 part by mass. When the blending ratio of the catalyst is within this range, the curing may be executed at the curing rate with which the foam body may be formed.

<Reaction Suppressor>

The reaction suppressors include benzotriazole; ethynyl group-containing alcohols (acetylene alcohols) such as ethynyl cyclohexanol, 2-ethynylisopropanol, 3-methyl-1-butyn-3-ol, 3,5-dimethyl-1-hexyn-3-ol and phenylbutynol; acrylonitrile; amide compounds such as N,N-diallylacetamide, N,N-diallylbenzamide, N,N,N',N'-tetraallyl-o-phthalic acid diamide, N,N,N',N'-tetraallyl-m-phthalic acid diamide and N,N,N',N'-tetraallyl-p-phthalic acid diamide; and sulfur, phosphorus, nitrogen, amine compounds, sulfur compounds, phosphorus compounds, tin, tin compounds, tetramethyl tetravinyl cyclotetrasiloxane, and organic peroxides such as hydroperoxide.

The reaction suppressor is used, with the ratio to 100 parts by mass of the copolymer being in the range of 0.01 to 5.0 parts by mass, preferably in the range of 0.05 to 3.0 parts by mass, or especially preferably in the range of 0.1 to 0.5 parts by mass. When the amount of the reaction suppressor is 0.01 or more parts by mass, the crosslinking rate can be suppressed, so that the reaction can be controlled readily. When the amount of the reaction suppressor is 5.0 or less parts by mass, the crosslinking rate is not suppressed excessively, so that the production cost can be lowered.

<Other Additives>

Other additives include inorganic fillers, flame retardants, antioxidants, UV absorbents, antistatics, coloring agents and viscosity regulators such as plasticizers.

The inorganic fillers include light calcium carbonate, heavy calcium carbonate, talc and clay. The kind and the blending ratio of these inorganic fillers are arbitrarily chosen in accordance with the use of the foam body, while the amount of the inorganic filler is, relative to 100 parts by mass of the copolymer, in the range of 0 to 400 parts by mass, preferably in the range of 10 to 150 parts by mass, or more preferably in the range of 30 to 70 parts mass. It is preferable that the amount of the inorganic filler be determined appropriately in view of the required physical properties.

Foam Body

The foam body according to the present invention is formed by blowing and crosslinking, at a temperature of 100 to 200° C., a foamable composition comprising a copolymer of ethylene, an α-olefin and a non-conjugated diene, a blowing agent, a crosslinking agent, a catalyst and a reaction suppressor, wherein in the foamable composition, the storage elastic modulus at 23° C. as measured by a viscoelasticity measuring apparatus is $2\times10^4$ Pa or lower; and the storage elastic modulus after the foamable composition is held at 115° C. for 200 seconds is $5\times10^4$ Pa or higher.

Characteristics of the Foam Body

<Average Foam Body>

A foam body obtained by using the foamable composition according to the present invention has an average foam cell diameter of 10 to 250 μm. When the average foam cell diameter is 10 μm, a foam body in which precision in thickness is high can be produced.

Here, the term "average foam cell diameter" is the value obtained by the following method. That is, the cross section of the foam body is observed by the scanning electron microscope S-3400N (manufactured by Hitachi High-Technologies Corp.); and then, the average value of diameters of arbitrarily selected 50 foams is calculated.

<Thickness of a Foam Body>

Even if the thickness of a foam body obtained by using the foamable composition according to the present invention is 0.05 to 1.0 mm, the required mechanical strength and the flexibility can be met. The thickness of a foam body can be made to be preferably 0.07 to 0.5 mm, and more preferably 0.1 to 0.3 mm.

<Porosity>

The term "porosity" means the ratio of the air portion relative to the total volume of the foam body. Porosity of the foam body can be measured, for example, by the procedure as described below.

A specimen having a square shape in a plane view, with length of 5 cm in each side and with a constant thickness is cut out from the foam body. Thickness of the specimen is measured, and volume $V_1$ of the specimen is measured, and then weight $W_1$ of the specimen is measured.

Next, apparent volume $V_2$ occupied by the air portion is calculated by using the following expression. Meanwhile $\rho_A$ (g/cm$^3$) is used as the density of the resin to constitute the specimen.

Apparent air portion volume $V_2=(V_1 \cdot \rho_A - W_1)/\rho_A$

Porisity={(apparent air portion volume $V_2$)/(specimen volume $V_1$)}×100

Porosity of a foam body obtained by using the foamable composition according to the present invention is in the range of 50 to 95% by volume. If the porosity is less than 50% by volume, the compressive stress becomes so large, thereby causing flotation of the member to clamp the foam body as well as deformation of the member by the repulsive stress to recover from the compressed state. If the porosity is more than 95% by volume, flexibility is enhanced too high to obtain sufficient cushioning property.

<Continuous Porosity>

The term "continuous porosity" means the ratio of pores connected from surface of the foam body to inside thereof relative to entirety of the pore. The continuous porosity may be measured, for example, by the procedure as described below.

The specimen is sunk in the depth of 100 mm from water surface in distilled water at 23° C., and the pressure of 15 kPa is applied to the specimen during the period of 3 minutes. Thereafter, the specimen is taken out from water and then water attached on surface of the specimen is removed. Weight $W_2$ of the specimen is measured and then the continuous porosity $F_1$ is calculated by using the following expression. Meanwhile, the independent porosity $F_2$ may be calculated from the continuous porosity.

$$\text{Continuous porosity } F_1(\%) = 100 \times (W_2 - W_1)/V_2$$

$$\text{Independent porosity } F_2(\%) = 100 - F_1$$

A foam body obtained by using the foamable composition according to the present invention has a continuous porosity of 40% or more. If the continuous porosity is less than 40%, compressive stress becomes so large, thereby causing flotation of the member to clamp the foam body as well as deformation of the member by the repulsive stress to recover from the compressed state.

<50% Compression Strength>

The strength at a 50% compression of a foam body obtained by using the foamable composition according to the present invention can be made to be 100 kPa or lower. When the strength at a 50% compression is 100 kPa or lower, flotation of the members to clamp the foam body and deformation of the member may be prevented from occurring because of the repulsive stress of the foam body to recover from the compressed state. Here, the strength of a foam body at a 50% compression is the value measured by the method according to JIS K6767.

<Impact Pressure>

The impact pressure of a foam body according to an embodiment of the present invention as measured via the foam body in the state of 50% compression in its thickness when 55 g mass of an iron weight is dropped thereon from the height of 1 m is 25 MPa/cm² or less.

Here, the "impact pressure" is obtained by the cushioning test method (called Sekisui method) as described below. That is, the foam body is cut into the vertical length of 2 cm and the horizontal length of 2 cm; and the pieces thereby obtained are stacked such that the total thickness may become 0.15 cm to obtain the foam body sample.

a steel plate having the vertical length of 6 cm, the horizontal length of 6 cm and the thickness of 2 mm, a pressure sensitive paper having the vertical length of 2 cm and the horizontal length of 2 cm (Prescale Paper for intermediate pressure, manufactured by Fujifilm Corp.), the above-mentioned foam body sample and a steel plate having the vertical length of 6 cm, the horizontal length of 6 cm and the thickness of 1 mm are stacked in this order from the bottom.

Then, four corners of the stack are clamped under the state of compression such that thickness of the foam body sample may become 50% from the original thickness to obtain the evaluation sample. This evaluation sample is fixed to a jig which has an open space in the central part thereof; and then, the weight having the weight of 55 g is dropped from the height of 1 m toward the steel plate placed on top of the evaluation sample such that the maximum impact force may be added to the central part of the evaluation sample. The pressure recorded on the pressure sensitive paper at this time is taken as the impact pressure. The impact pressure is calculated by image analysis of the pressure sensitive paper by using the pressure image analysis system (Data Shot FPD-100, manufactured by Fujifilm Corp.).

Method for Producing a Foam Body

<Production Method>

A method for producing a foam body comprises a step of forming a resin composition comprising a copolymer of ethylene, an α-olefin and a non-conjugated diene, the above-mentioned blowing agent, a crosslinking agent and a liquid blowing agent, and a step of heating the resin composition to the temperature capable of crosslinking this resin composition.

In the step of forming the resin composition, a copolymer of ethylene, an α-olefin and a non-conjugated diene, a crosslinking agent and a liquid blowing agent are kneaded by a kneader such as a Banbury mixer and a pressurized kneader. Thereafter, the resin composition is continuously transported by using a calendar, an extruder, a conveyer belt casting and the like while kneading the composition to make it a sheet.

In the step of heating, the resin composition that is made to a sheet is heated to the temperature capable of crosslinking the resin composition.

Boiling point of the blowing agent is preferably lower than the temperature capable of crosslinking by the crosslinking agent; and thus, boiling point of the blowing agent is preferably 200° C. or lower. By using a blowing agent having the boiling point lower than the temperature capable of crosslinking, the pore may be formed in the step of heating for crosslinking.

Meanwhile, after crosslinking the resin composition, a step of heating to blow the blowing agent may be executed. Alternatively, after the step of heating to blow the blowing agent, the step of heating for crosslinking may be executed.

The method for producing a foam body may have a step of extending the foam body. The step of extending the foam body may be executed while heating thereof in the heating step after the sheeting process.

Meanwhile, blowing treatment methods usable are heretofore known methods, including those described in "Plastic Foam Handbook" (edited by Hiroshi Maki and Atsushi Kosakada, Published by Nikkan Kogyo Shimbun, Ltd., 1973).

EXAMPLES

The present invention will be explained in more detail by Examples, but the present invention is not restricted to these Examples.

Measurement Methods

<Storage Elastic Modulus>

The storage elastic modulus was measured by a viscoelasticity measuring apparatus "MCR-301," manufactured by Anton-Paar GmbH. About 80 mg of a foamable composition in which a blowing agent had been added was made as a measuring sample, and the measurement was carried out at an angular frequency of 1 (/sec), at a vibrating angle of 1% and at a temperature of 23° C. Also a storage elastic modulus after the foamable composition was held at 115° C. for 200 seconds was similarly measured.

<Average Foam Cell Diameter>

In calculation of the average foam cell diameter, the cross section of the foam body was observed by the scanning electron microscope S-3400N (manufactured by Hitachi High- Technologies Corp.); and then, the average value of the diameters of arbitrarily selected 50 foam cells was calculated.

<Porosity>

In calculation of the porosity, specimen having a square shape in a plane view, with length of 5 cm in each side and with a constant thickness was cut out from the foam body, thickness of the specimen was measured, and volume $V_1$ and weight $W_1$ of the specimen were measured. The apparent volume $V_2$ occupied by the air portion was calculated by using the following expression. Meanwhile, $\rho_A$ (g/cm$^3$) was used as the density of the resin to constitute the specimen.

Apparent air portion volume $V_2=(V_1 \cdot \rho_A - W_1)/\rho_A$

Porosity={(apparent air portion volume $V_2$)/(specimen volume $V_1$)}×100

<Continuous Porosity>

The continuous porosity was calculated by using the following expression by sinking the specimen in the depth of 100 mm from water surface in distilled water at 23° C., applying pressure of 15 kPa to the specimen during the period of for 3 minutes, thereafter taking out the specimen from the water, removing water attached on surface of the specimen, and measuring weight $W_2$ of the specimen.

Continuous porosity $F_1(\%)=100 \times (W_2-W_1)/V_2$

<50% Compression Strength>

The 50% compression strength was measured by using the respective specimens of the foam bodies obtained in Examples and Comparative Examples in accordance with JIS K6767.

<Impact Pressure>

The "impact pressure" was obtained by the cushioning test method (called Sekisui method) as described below. That is, the foam bodies cut into the vertical length of 2 cm and the horizontal length of 2 cm were stacked so as to give the total thickness of 0.15 cm to obtain the foam body sample.

A steel plate having the vertical length of 6 cm, the horizontal length of 6 cm and the thickness of 2 mm, a pressure sensitive paper cut into the vertical length of 2 cm and the horizontal length of 2 cm (Prescale Paper for intermediate pressure, manufactured by Fujifilm Corp.), the above-mentioned foam body sample and a steel plate having the vertical length of 6 cm, the horizontal length of 6 cm and the thickness of 1 mm were stacked in this order from the bottom.

Then, four corners of the stack were clamped under the state of compression such that thickness of the foam body sample might become 50% from the original thickness to obtain the evaluation sample. This evaluation sample was fixed to a jig which had an open space in the central part thereof; and then, the iron ball having the weight of 55 g was dropped from the height of 1 m toward the evaluation sample such that the maximum impact force might be added to the central part of the evaluation sample. The impact pressure was calculated by image analysis of the pressure sensitive paper by using the pressure image analysis system (Data Shot FPD-100, manufactured by Fujifilm Corp.). It can be said that when the calculated pressure is lower, the foam body has better cushioning property.

Production of Foam Bodies

Production Example 1

In accordance with the blending recipe shown in Table 1, a copolymer A, a crosslinking agent A, a platinum catalyst, a reaction suppressor, calcium carbonate as an inorganic filler, and a plasticizer were mixed, and then the resulting mixture was stirred for 3 minutes by a planetary agitator mixer (Thinky Mixer ARE-310, manufactured by Thinky Corp.), and then a defoaming treatment thereof was for 1 minute to obtain a mixture solution. In addition, a blowing agent A was added to the mixture solution, and then, they were stirred to obtain the foamable composition.

The foamable composition thereby obtained was applied onto the releasing side of PET sheet treated on one side thereof with a releasing treatment and having the thickness of 50 μm such that the thickness thereof might become 100 μm. Subsequently, a different PET sheet treated on one side thereof with the releasing treatment and having the thickness of 50 μm was put on the coated foamable composition such that the releasing side thereof might contact with the foamable composition, to obtain a stacked body. This stacked body was heated in an oven at 115° C. for 180 seconds. After the stacked body was taken out from the oven, one of the PET sheets was removed, and then, the remainder was dried for 25 minutes again in the oven at 115° C.

By doing so, the foam body in the sheet was obtained. The characteristics of the foam body sheet thereby obtained were evaluated by the above-mentioned methods. The results thereof are shown in Table 2.

Production Example 2

A copolymer B was used in place of the copolymer A. The procedure of Production Example 1 was repeated, except for altering the blending ratio of the blowing agent A to 10 parts by mass, and the blending ratio of the crosslinking agent A to 16 parts by mass, and using no plasticizer, to obtain the foam body sheet. The characteristics of the foam body sheet thereby obtained were evaluated by the above-mentioned methods. The results thereof are shown in Table 2.

Production Example 3

The procedure of Production Example 1 was repeated, except for using 7.5 parts by mass of a blowing agent B as the blowing agent, to obtain the foam body sheet. The characteristics of the foam body sheet thereby obtained were evaluated by the above-mentioned methods. The results thereof are shown in Table 2.

Production Example 4

The procedure of Production Example 2 was repeated, except for using 20 parts by mass of the blowing agent D as the blowing agent, to obtain the foam body sheet.

Production Example 5

The procedure of Production Example 1 was repeated, except for adding no inorganic filler and using no plasticizer, to obtain the foam body sheet.

Production Example 6

The procedure of Production Example 2 was repeated, except for altering the blending ratio of the crosslinking agent b as the crosslinking agent to 11 parts by mass, to obtain the foam body sheet.

Production Example 7

The procedure of Production Example 5 was repeated, except for altering the blending ratio of the catalyst to 0.1 parts by mass, and the blending ratio of the reaction suppressor to 0.2 parts by mass, to obtain the foam body sheet.

Production Example 8

The procedure of Production Example 2 was repeated, except for altering the blending ratio of the catalyst to 1.5 parts by mass, and the blending ratio of the reaction suppressor to 3 parts by mass, to obtain the foam body sheet.

Production Example 9

The procedure of Production Example 2 was repeated, except for altering the blending ratio of the blowing agent A to 5 parts by mass, and the blending ratio of the inorganic filler to 20 parts by mass, to obtain the foam body sheet.

Comparative Production Example 1

The procedure of Production Example 1 was repeated, except for altering the blending ratio of the blowing agent A to 7.5 parts by mass, the blending ratio of the platinum catalyst solution to 0.6 parts by mass, the blending ratio of the reaction suppressor to 0.6 parts by mass, and the blending ratio of the inorganic filler to 100 parts by mass, and using no plasticizer, to obtain the foam body sheet. The characteristics of the foam body sheet thereby obtained were evaluated by the above-mentioned methods. The results thereof are shown in Table 2.

Comparative Production Example 2

The procedure of Production Example 1 was repeated, except for altering the blending ratio of the platinum catalyst solution to 0.6 parts by mass, the blending ratio of the reaction suppressor to 0.6 parts by mass, and the blending ratio of the inorganic filler to 100 parts by mass, and using no plasticizer, to obtain the foam body sheet. The characteristics of the foam body sheet thereby obtained were evaluated by the above-mentioned methods. The results thereof are shown in Table 2.

Comparative Production Example 3

The procedure of Production Example 1 was repeated, except for altering the blending ratio of the blowing agent A to 10 parts by mass, the blending ratio of the platinum catalyst solution to 0.6 parts by mass, the blending ratio of the reaction suppressor to 0.6 parts by mass, and the blending ratio of the inorganic filler to 100 parts by mass, and using no plasticizer, to obtain the foam body sheet. The characteristics of the foam body sheet thereby obtained were evaluated by the above-mentioned methods. The results thereof are shown in Table 2.

Comparative Production Example 4

The procedure of Production Example 2 was repeated, except for altering the blending ratio of the blowing agent A to 5 parts by mass, the blending ratio of the platinum catalyst solution to 0.6 parts by mass, and the blending ratio of the reaction suppressor to 0.6 parts by mass, to obtain the foam body sheet. The characteristics of the foam body sheet thereby obtained were evaluated by the above-mentioned methods. The results thereof are shown in Table 2.

Comparative Production Example 5

20 parts by mass of a blowing agent C was used as the blowing agent. The procedure of Production Example 2 was repeated, except for altering the blending ratio of the crosslinking agent A to 13.5 parts by mass, and blending no inorganic filler, to obtain the foam body sheet. The characteristics of the foam body sheet thereby obtained were evaluated by the above-mentioned methods. The results thereof are shown in Table 2.

Comparative Production Example 6

The procedure of Production Example 5 was repeated, except for using 5 parts by mass of a blowing agent E as the blowing agent, to obtain the foam body sheet.

Comparative Production Example 7

The procedure of Production Example 5 was repeated, except for altering the blending ratio of the reaction suppressor to 6 parts by mass, to obtain the foam body sheet.

Comparative Production Example 8

The procedure of Production Example 5 was repeated, except for using 1 part by mass of the crosslinking agent A as the crosslinking agent, to obtain the foam body sheet.

TABLE 1

| | | Production Example | | | | | | | | | Comparative Production Example | | | | | | | |
|---|---|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 | 6 | 7 | 8 |
| Blending recipe (parts by mass) | Copolymer A *1 | 100 | 0 | 100 | 0 | 100 | 0 | 100 | 100 | 0 | 100 | 100 | 100 | 0 | 0 | 100 | 100 | 100 |
| | Copolymer B *2 | 0 | 100 | 0 | 100 | 0 | 100 | 0 | 0 | 100 | 0 | 0 | 0 | 100 | 100 | 0 | 0 | 0 |
| | Blowing agent A *3 | 5 | 10 | 0 | 0 | 5 | 10 | 5 | 5 | 5 | 7.5 | 5 | 10 | 5 | 0 | 0 | 5 | 5 |
| | Blowing agent B *4 | 0 | 0 | 7.5 | 0 | 0 | 0 | 0 | 0 | 0 | 0 | 0 | 0 | 0 | 0 | 0 | 0 | 0 |
| | Blowing agent C *5 | 0 | 0 | 0 | 0 | 0 | 0 | 0 | 0 | 0 | 0 | 0 | 0 | 0 | 20 | 0 | 0 | 0 |
| | Blowing agent D *6 | 0 | 0 | 0 | 20 | 0 | 0 | 0 | 0 | 0 | 0 | 0 | 0 | 0 | 0 | 0 | 0 | 0 |
| | Blowing agent E *7 | 0 | 0 | 0 | 0 | 0 | 0 | 0 | 0 | 0 | 0 | 0 | 0 | 0 | 0 | 5 | 0 | 0 |
| | Crosslinking agent A *8 | 7 | 16 | 7 | 16 | 7 | 0 | 7 | 7 | 16 | 7 | 7 | 7 | 16 | 13.5 | 7 | 7 | 1 |
| | Crosslinking agent B *9 | 0 | 0 | 0 | 0 | 0 | 11 | 0 | 0 | 0 | 0 | 0 | 0 | 0 | 0 | 0 | 0 | 0 |

TABLE 1-continued

|  | Production Example | | | | | | | | | Comparative Production Example | | | | | | | |
| --- | --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 1 | 2 | 3 | 4 | 5 | 6 | 7 | 8 |
| Platinum catalyst solution *10 | 0.4 | 0.4 | 0.4 | 0.4 | 0.4 | 0.4 | 0.1 | 1.5 | 0.4 | 0.6 | 0.6 | 0.6 | 0.6 | 0.4 | 0.4 | 0.4 | 0.4 |
| Reaction suppressor *11 | 0.4 | 0.4 | 0.4 | 0.4 | 0.4 | 0.4 | 0.2 | 3 | 0.4 | 0.6 | 0.6 | 0.6 | 0.6 | 0.4 | 0.4 | 6 | 0.4 |
| Inorganic filler *12 | 50 | 50 | 50 | 50 | 0 | 50 | 0 | 0 | 20 | 100 | 100 | 100 | 50 | 0 | 0 | 0 | 0 |
| Plasticizer *13 | 60 | 0 | 60 | 0 | 0 | 0 | 0 | 0 | 0 | 0 | 0 | 0 | 0 | 0 | 0 | 0 | 0 |

*1: Ethylene-propylene-5-vinyl-2-norbornene random copolymer, "PX-062" manufactured by Mitsui Chemicals Inc., number-average molecular weight: 3160, ethylene content: 52.7% by mass, diene content: 4.7% by mass, and complex viscosity at 25° C.: 830 Pa · s (1 rpm)
*2: Ethylene-propylene-5-vinyl-2-norbornene random copolymer, "PX-068" manufactured by Mitsui Chemicals Inc., number-average molecular weight: 920, ethylene content: 50% by mass, diene content: 11% by mass, and complex viscosity at 25° C.: 10 Pa · s (1 rpm)
*3: Blowing agent A, methyl ethyl ketone (evaporation rate: 3.7)
*4: Blowing agent B, toluene (evaporation rate: 2.0)
*5: Blowing agent C, hexane (evaporation rate: 7.2)
*6: Blowing agent D, xylene (evaporation rate: 0.76)
*7: Blowing agent E, diethyl ether (evaporation rate: 11)
*8: Crosslinking agent A, siloxane-type crosslinking agent (SiH group-containing compound shown by the following formula, manufactured by Shin-Etsu Chemical Co., Ltd.)

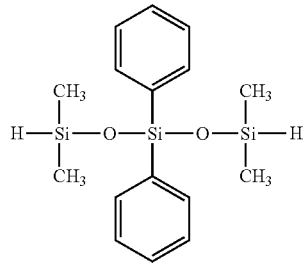

*9: Crosslinking agent B, siloxane-type crosslinking agent (SiH group-containing compound shown by the following formula, manufactured by Shin-Etsu Chemical Co., Ltd.)

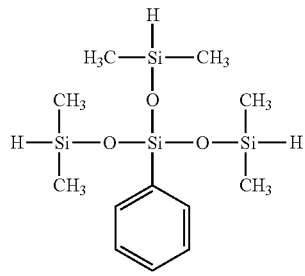 [SMILES: C[SiH](C)O[Si](O[SiH](C)C)(O[SiH](C)C)c1ccccc1]

*10: Platinum catalyst (mixture of 3% Pt-CTS-CTS solution, Pt/1,3,5,7-tetravinyl-1,3,5,7-tetramethylcyclotetrasiloxane complex and 1,3,5,7-tetravinyl-1,3,5,7-tetramethylcyclotetrasiloxane, manufactured by N.E. Chemcat Corp.)

*11: Acetylene alcohol (X93-1036, manufactured by Shin-Etsu Chemical Co., Ltd.)

*12: Calcium carbonate (Whiton SB Red, manufactured by Shiraishi Calcium Kaisha, Ltd.)

*13: Plasticizer, paraffin oil (Fresia S-32, manufactured by Idemitsu Kosan co., Ltd.)

Examples 1 to 9, and Comparative Examples 1 to 8

Specimens of Examples 1 to 9 and Comparative Examples 1 to 8 were prepared from the foam body sheets obtained in the above-mentioned Production Examples 1 to 9 and the foam body sheets obtained in Comparative Production Examples 1 to 8; and the 50% compression strength, and the impact pressure measured via the foam body sheet were measured by the above-mentioned methods. The results thereof are shown in Table 2.

TABLE 2

|  |  |  | Example | | | | | | |
| --- | --- | --- | --- | --- | --- | --- | --- | --- | --- |
|  |  |  | 1 | 2 | 3 | 4 | 5 | 6 | 7 |
| Foamable composition | Evaluation results | Storage elastic modulus at 23° C. (Pa) | $2 \times 10^2$ | $1 \times 10^2$ | $8 \times 10^0$ | $4 \times 10^1$ | $3 \times 10^2$ | $1.5 \times 10^2$ | $3 \times 10^2$ |
|  |  | Storage elastic modulus after held at 115° C. for 200 sec (Pa) | $2.2 \times 10^5$ | $9 \times 10^4$ | $6 \times 10^4$ | $9 \times 10^4$ | $1.5 \times 10^5$ | $1.3 \times 10^5$ | $1.5 \times 10^5$ |
| Foam body | Characteristics | Average foam diameter (μm) | 200 | 250 | 250 | 200 | 250 | 250 | 250 |
|  |  | Thickness of foam body (mm) | 0.4 | 0.45 | 0.55 | 0.4 | 0.5 | 0.5 | 0.5 |
|  | Evaluation results | Porosity (%) | 70 | 75 | 80 | 62 | 65 | 55 | 60 |
|  |  | Continuous porosity (%) | 70 | 80 | 55 | 40 | 45 | 40 | 40 |

TABLE 2-continued

|  |  |  | | | | | | | |
|---|---|---|---|---|---|---|---|---|---|
|  |  | 50% compression strength (kPa) | 15 | 10 | 10 | 35 | 35 | 50 | 30 |
|  |  | Impact pressure measured via foam body sheet (MPa) | 20 | 25 | 35 | 20 | 25 | 20 | 35 |

|  |  |  | Example | | Comparative Example | | | |
|---|---|---|---|---|---|---|---|---|
|  |  |  | 8 | 9 | 1 | 2 | 3 | 4 |
| Foamable composition | Evaluation results | Storage elastic modulus at 23° C. (Pa) | $3 \times 10^2$ | $2 \times 10^3$ | $1.5 \times 10^5$ | $3 \times 10^4$ | $8 \times 10^3$ | $1.2 \times 10^2$ |
|  |  | Storage elastic modulus after held at 115° C. for 200 sec (Pa) | $1.8 \times 10^5$ | $1 \times 10^5$ | $5 \times 10^5$ | $4 \times 10^4$ | $1 \times 10^4$ | $2 \times 10^2$ |
| Foam body | Characteristics | Average foam diameter (μm) | 200 | 200 | 100 | 150 | >500 | unmeasurable due to foam coarsening |
|  |  | Thickness of foam body (mm) | 0.4 | 0.4 | 0.1 | 0.15 | 0.6 | 0.15 |
|  | Evaluation results | Porosity (%) | 40 | 65 | 5 | 5 | 93 | 95 |
|  |  | Continuous porosity (%) | 30 | 40 | 0 | 0 | 85 | unmeasurable due to foam coarsening |
|  |  | 50% compression strength (kPa) | 75 | 30 | 1500 | 1500 | 15 | 10 |
|  |  | Impact pressure measured via foam body sheet (MPa) | 20 | 40 | 20 | 20 | 85 | >100 |

|  |  |  | Comparative Example | | | |
|---|---|---|---|---|---|---|
|  |  |  | 5 | 6 | 7 | 8 |
| Foamable composition | Evaluation results | Storage elastic modulus at 23° C. (Pa) | $3 \times 10^4$ | $3 \times 10^2$ | $3 \times 10^2$ | $4 \times 10^2$ |
|  |  | Storage elastic modulus after held at 115° C. for 200 sec (Pa) | $5 \times 10^2$ | $1.5 \times 10^5$ | $4 \times 10^2$ | $6 \times 10^2$ |
| Foam body | Characteristics | Average foam diameter (μm) | unmeasurable due to foam coarsening | unmeasurable due to foam coarsening | unmeasurable due to foam coarsening | unmeasurable due to foam coarsening |
|  |  | Thickness of foam body (mm) | 0.15 | 0.13 | unmeasurable due to being uncurable | unmeasurable due to being uncurable |
|  | Evaluation results | Porosity (%) | 95 | unmeasurable due to foam coarsening | unmeasurable due to being uncurable | unmeasurable due to being uncurable |
|  |  | Continuous porosity (%) | unmeasurable due to foam coarsening | unmeasurable due to foam coarsening | unmeasurable due to foam coarsening | unmeasurable due to foam coarsening |
|  |  | 50% compression strength (kPa) | 10 | unmeasurable due to foam coarsening | unmeasurable due to being uncurable | unmeasurable due to being uncurable |
|  |  | Impact pressure measured via foam body sheet (MPa) | >100 | >100 | unmeasurable due to being uncurable | unmeasurable due to being uncurable |

Measurement Results

It was found from the test results of Examples 1 to 9 and Comparative Examples 1 to 8 shown in Table 2 that Production Examples 1 to 9 each provide a sheet of a foam body having a low 50% compression strength, and having a low impact pressure and being excellent in the impact absorbing performance.

The invention claimed is:

1. A foamable composition, comprising: a copolymer of ethylene, an α-olefin and a non-conjugated diene; a blowing agent; a crosslinking agent; a catalyst; and a reaction suppressor,
    wherein the foamable composition has a storage elastic modulus at 23° C. as measured by a viscoelasticity measuring apparatus of $2 \times 10^4$ Pa or lower, and a storage elastic modulus after the foamable composition is held at 115° C. for 200 seconds of $5\times10^4$ Pa or higher, wherein the foamable composition comprises an organic solvent being liquid at 23° C. as the blowing agent, and wherein the blowing agent is an organic solvent having a relative evaporation rate of 0.5 to 3.7 in the case where the evaporation rate of n-butyl acetate at 25° C. is taken to be 1.0.

2. The foamable composition according to claim 1, wherein the crosslinking agent is a crosslinking agent having at least 2 SiH groups per molecule thereof.

3. The foamable composition according to claim 1, wherein the foamable composition comprises, relative to 100 parts by mass of the copolymer, 3 to 25 parts by mass of the crosslinking agent, 0.01 to 3.0 parts by mass of the catalyst, and 0.01 to 5.0 parts by mass of the reaction suppressor.

4. A foam body, being formed by blowing and crosslinking, at a temperature of 100 to 200° C., a foamable composition comprising a copolymer of ethylene, an α-olefin and a non-conjugated diene, a blowing agent, a crosslinking agent, a catalyst and a reaction suppressor, wherein the foamable composition has a storage elastic modulus at 23° C. as measured by a viscoelasticity measuring apparatus of $2\times10^4$ Pa or lower, and a storage elastic modulus after the foamable composition is held at 115° C. for 200 seconds of $5\times10^4$ Pa or higher, wherein the foamable composition comprises an organic solvent being liquid at 23° C. as the blowing agent, and wherein the blowing agent is an organic solvent having a relative evaporation rate of 0.5 to 3.7 in the case where the evaporation rate of n-butyl acetate at 25° C. is taken to be 1.0.

5. The foam body according to claim 4, wherein the foam body contains foam having an average foam cell diameter of 10 μm to 250 μm.

6. The foam body according to claim 4, wherein the foam body has thickness of 0.07 mm to 0.5 mm.

* * * * *